United States Patent
Iwamoto (10) Patent No.: US 9,350,190 B2
(45) Date of Patent: May 24, 2016

(54) INFORMATION PROCESSING APPARATUS AND BATTERY CHARGING METHOD OF INFORMATION PROCESSING APPARATUS

(71) Applicant: TOSHIBA TEC KABUSHIKI KAISHA, Shinagawa-ku, Tokyo (JP)

(72) Inventor: Jun Iwamoto, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 14/197,370

(22) Filed: Mar. 5, 2014

(65) Prior Publication Data
US 2014/0253049 A1 Sep. 11, 2014

(30) Foreign Application Priority Data

Mar. 5, 2013 (JP) ................................. 2013-042826

(51) Int. Cl.
*H02J 7/04* (2006.01)
*H02J 7/16* (2006.01)
*H02J 7/00* (2006.01)

(52) U.S. Cl.
CPC ............... *H02J 7/007* (2013.01); *H02J 7/0075* (2013.01)

(58) Field of Classification Search
CPC ........................................................ Y02E 60/12
USPC ......................................................... 320/162
See application file for complete search history.

(56) References Cited

U.S. PATENT DOCUMENTS

| | | | |
|---|---|---|---|
| 6,911,804 B2 | 6/2005 | Mori | |
| 2004/0066171 A1* | 4/2004 | Mori | ....................... G06F 1/263 320/132 |
| 2011/0175576 A1 | 7/2011 | Uesaka et al. | |

FOREIGN PATENT DOCUMENTS

| | | |
|---|---|---|
| JP | 09-007641 | 1/1997 |
| JP | 2004-094607 | 3/2004 |
| JP | 2011-151891 | 8/2011 |

OTHER PUBLICATIONS

Office Action of Notification of Reasons for Refusal for Japanese Patent Application No. 2013-042826 Dated Jun. 17, 2014, 12 pages.

* cited by examiner

*Primary Examiner* — Suresh Memula
(74) *Attorney, Agent, or Firm* — Amin, Turocy & Watson LLP; Gregory Turocy (57) ABSTRACT

In accordance with one embodiment, an information processing apparatus comprises a power supply section configured to be connectable to an AC power supply, a battery, a remaining battery level detection section configured to detect the remaining battery level, a first threshold value setting section configured to set a charge level lower than a full charge of the battery, a second threshold value setting section configured to set a charge level lower than the first threshold value, and a charging condition setting section configured to output an instruction on charging of the battery such that the remaining battery level changes back and forth between the first threshold value and the second threshold value.

4 Claims, 6 Drawing Sheets

INFORMATION PROCESSING APPARATUS AND BATTERY CHARGING METHOD OF INFORMATION PROCESSING APPARATUS

CROSS-REFERENCE TO RELATED APPLICATION

This application is based upon and claims the benefit of priority from Japanese Patent Application No. 2013-042826, filed Mar. 5, 2013, the entire contents of which are incorporated herein by reference.

FIELD

Embodiments described herein relate to an information processing apparatus and a battery charging method of the information processing apparatus.

BACKGROUND

A POS (Point of Sales) terminal is used as a settlement terminal when selling a commodity. Generally, these POS terminals are connected with an AC power supply and used. However, in recent years, commodity sales in outdoors where there is no AC power supply device is increasing and therefore a POS terminal provided with a secondary battery is used more and more frequently.

The charge/discharge operation is repeated on the used secondary battery, however, the deterioration of battery may be expedited if an improper charging method is used. Therefore, a method of quick charging without causing the deterioration of the battery performance of the secondary battery is being considered.

In a case where the deterioration of the secondary battery is taken into consideration, and the battery is in a charge state in which the battery level is below that in a full charge state, if the POS terminal is taken out, for the commodity sales, to the outdoors in that state, as the use of the terminal is stated in a state different from the full charge state, the use time of the terminal decreases compared with the terminal in the full charge state.

DETAILED DESCRIPTION

In accordance with one embodiment, an information processing apparatus comprises a power supply section configured to be connectable to an AC power supply, a battery, a remaining battery level detection section configured to detect the remaining battery level, a first threshold value setting section configured to set a charge level lower than a full charge of the battery, a second threshold value setting section configured to set a charge level lower than the first threshold value, and a charging condition setting section configured to output an instruction on charging of the battery such that the remaining battery level changes back and forth between the first threshold value and the second threshold value.

Hereinafter, the information processing apparatus according to one embodiment of the present invention is described in detail with reference to accompanying drawings.

A First Embodiment

Figure 1:
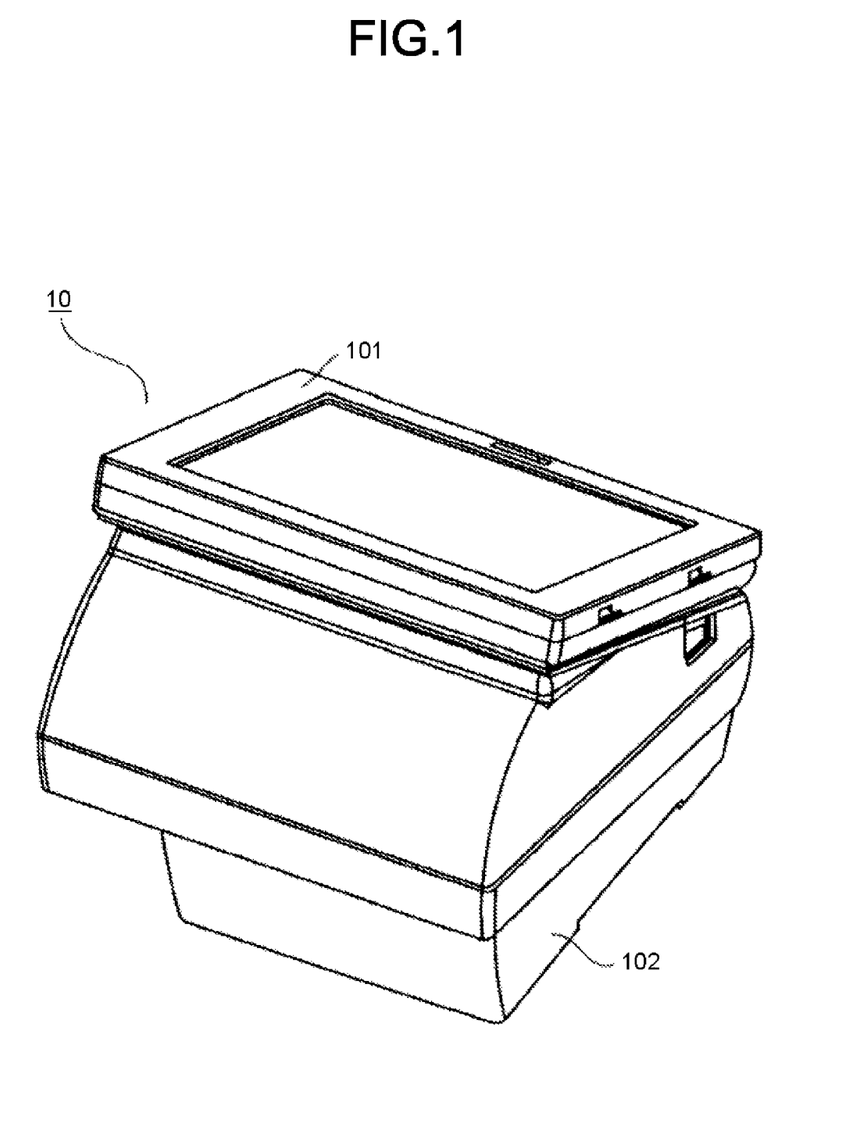
FIG. 1 is a diagram illustrating a back perspective view of an information processing apparatus according to a first embodiment.

FIG. 1 is a back perspective view of an information processing apparatus 10 serving as one example of the present embodiment. In addition, the information processing apparatus 10 includes a so-called POS terminal apparatus and a KIOSK terminal apparatus (street installation type multifunction information processing apparatus).

As shown in FIG. 1, the information processing apparatus 10 comprises a touch panel 101 and an information processing apparatus main body 102.

Figure 2:
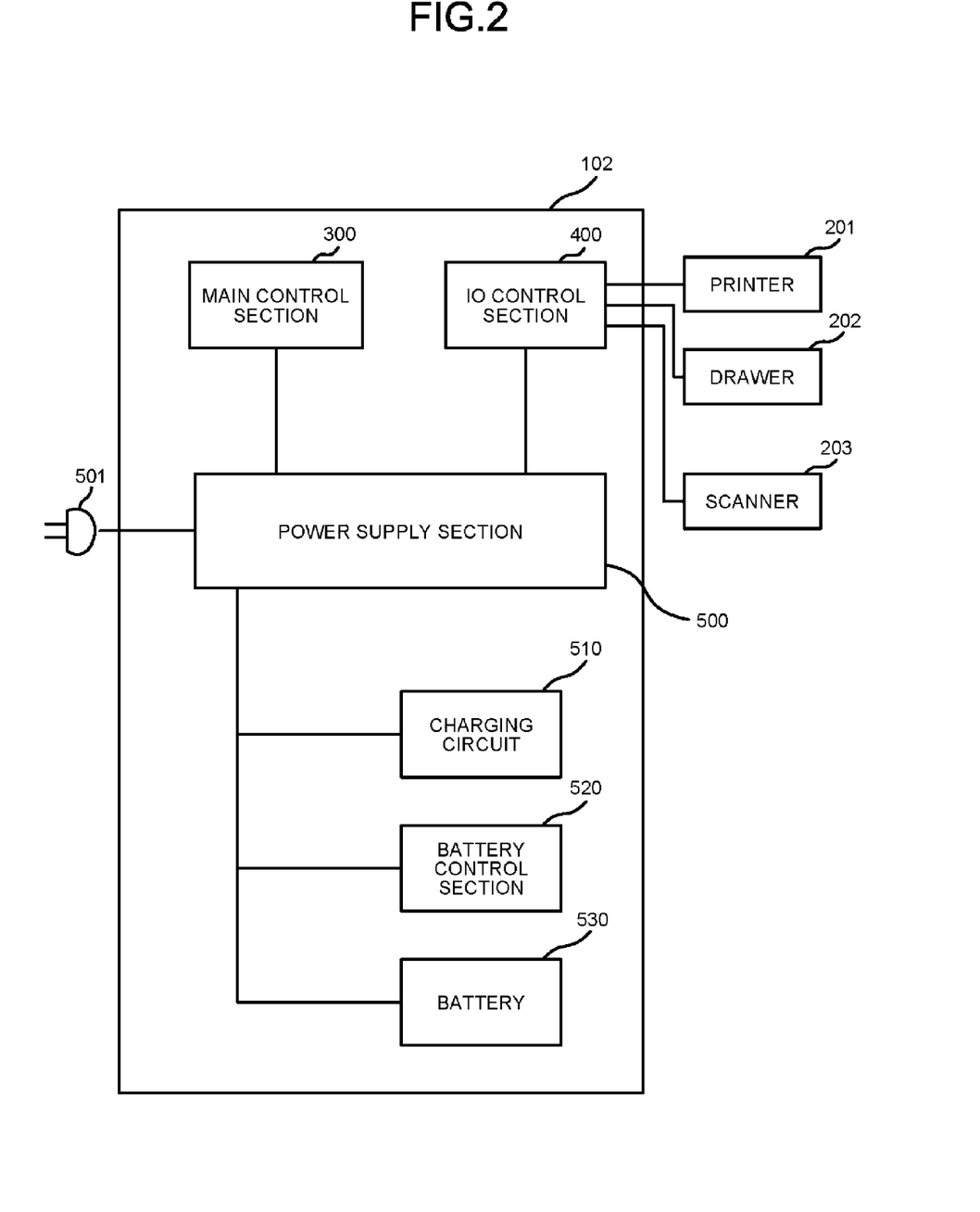
FIG. 2 is a block diagram illustrating a control circuit constitution of the information processing apparatus according to the first embodiment.

FIG. 2 is a block diagram illustrating a main portion constitution of the information processing apparatus main body 102. In addition, in a case where the information processing apparatus 10 is the POS terminal apparatus, the information processing apparatus 10 is connectable to a connection device such as a printer 201, a drawer 202, a scanner 203 and the like.

As shown in FIG. 2, the information processing apparatus main body 102 is provided with a main control section 300 for processing information, an IO control section 400 for controlling input/output of information, a power supply section 500 for supplying power, a charging circuit 510 for charging the battery, a battery control section 520 for setting charging conditions to the battery and a battery 530 serving as a secondary battery.

The main control section 300 comprises a CPU serving as an arithmetic device, a memory serving as a storage device such as a ROM, RAM and the like, a nonvolatile storage device serving as an auxiliary storage device such as a flash memory, hard disk drive and the like, a clocking section serving as a timer for storing the current time, and the like.

The IO control section 400 comprises a communication interface capable of supplying power, such as a powered USB, a powered COM and the like. The IO control section 400 is connected with connection devices such as the printer 201, the drawer 202, the scanner 203 and the like to supply power and communicate information.

The power supply section 500 is connectable to an external power source 501, and supplies power to the main control section 300 and the IO control section 400.

The charging circuit 510 receives an instruction of a charging method from the battery control section 520, and then charges the battery 530 with the power from the power supply section 500.

The battery control section 520 instructs the charging circuit 510 to carry out a charging operation according to the charging method set in a charging condition setting section 526 which will be described later.

The battery 530 is a secondary battery for supplying power to the information processing apparatus 10 in a case where the external power source 501 serving as an AC power supply is not connected with the power supply section 500.

Figure 3:
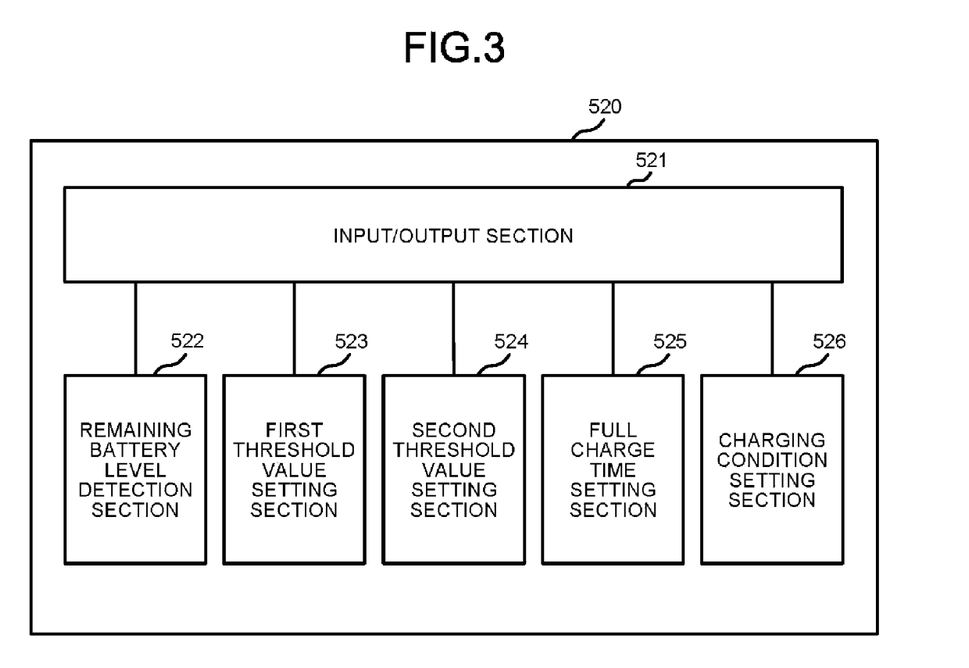
FIG. 3 is a block diagram illustrating a control circuit constitution of a battery control section according to the first embodiment.

The constitution of the battery control section 520 is shown in FIG. 3. The battery control section 520 includes an input/output section 521, a remaining battery level detection section 522, a first threshold value setting section 523, a second threshold value setting section 524, a full charge time setting section 525 and a charging condition setting section 526.

Generally, when charging an empty battery, the battery is charged in one go until the battery reaches a full charge (100%), after a full charge, the charge/discharge is repeated little by little. As a result, the deterioration of battery progresses.

Figure 4:
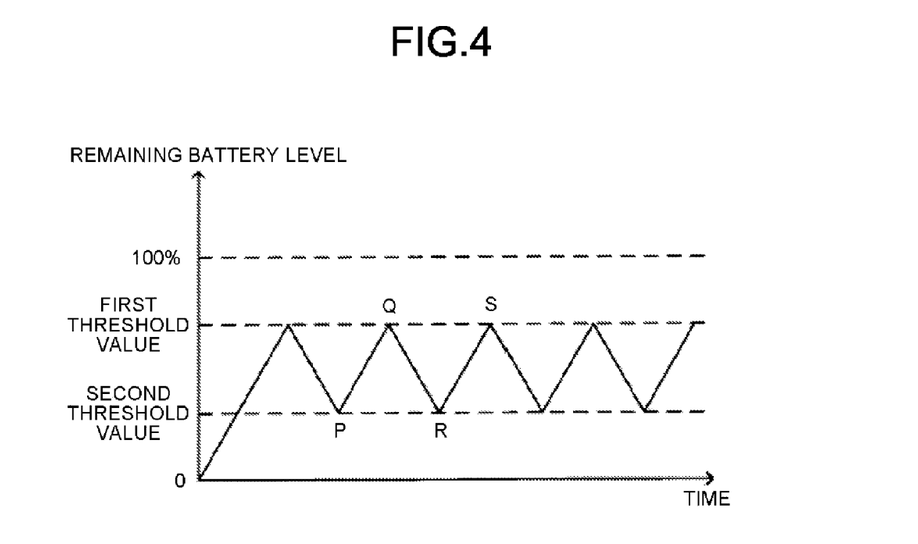
FIG. 4 is an illustration diagram illustrating a relation between remaining battery level and time according to the first embodiment.

In order to prevent the deterioration of battery, in the present embodiment, as shown in FIG. 4, a first threshold value indicating a remaining battery level lower than a full charge (100%) and a second threshold value indicating a remaining battery level lower than the first threshold value are set, the charging operation is continued until the battery level reaches the first threshold value, and the charging operation is stopped when detecting that the battery level reached the first threshold value. Then, a next charging operation is not carried out until it is detected that the remaining battery level is below the second threshold value. It is possible to prevent the deterioration of battery by carrying out such a control.

Further, there also exists a need of operating the POS terminal apparatus serving as the information processing apparatus 10 in outdoors where there is no AC power supply device. Generally, such a use is not needed suddenly, and in most cases, the start time of using the apparatus is made clear in advance in a way like, for example, notifying that the apparatus will be used in outdoors where there is no AC power supply device from oo o'clock. In such as case, the full charge time serving as a taking-out time is set, and the charging condition is changed such that the battery reaches full charge at that time.

Hereinafter, the charging method according to the present embodiment is described with reference to FIG. 4 to FIG. 6.

An operator using the information processing apparatus 10 sets the charging condition of the battery 530, such as the first threshold value, the second threshold value, and the full charge time serving as the taking-out time, in advance.

The first threshold value is such a value that if the remaining battery level of the battery 530 is above the value, the charging to the battery 530 is stopped. In the present embodiment, the first threshold value is set to 70% of the full charge (100%). The operator sets the first threshold value on the screen of the touch panel 101. The first threshold value is stored in the first threshold value setting section 523 of the battery control section 520.

The second threshold value is such a value that if the remaining battery level of the battery 530 is below the value, the charging to the battery 530 is carried out. In the present embodiment, the second threshold value is set to 30% of the full charge (100%). The operator sets the second threshold value on the screen of the touch panel 101. The second threshold value is stored in the second threshold value setting section 524 of the battery control section 520.

The full charge time is the scheduled time of taking out the information processing apparatus 10 such as the POS terminal and the like to a place where there is no AC power supply device as stated above. The operator sets the full charge time serving as the taking-out time on the screen of the touch panel 101. The full charge time is stored in the full charge time setting section 525 of the battery control section 520. In addition, in a case where the taking-out schedule is not determined, the data of 'no schedule' is stored in the full charge time setting section 525.

The charging of the battery 530 is described in detail with reference to FIG. 6.

The information processing apparatus 10 checks, at a predetermined timing such as a timing when the power is switched on, the remaining battery level of the battery 530 using the remaining battery level detection section 522 of the battery control section 520 (ACT S1). When the remaining battery level is checked, the charging operation is started according to the charging method stored in the charging condition setting section 526.

First, the information processing apparatus 10 confirms whether or not the taking-out time is set in the full charge time setting section 525 (ACT S2). Herein, if the taking-out time is not set (NO in ACT S2), it is confirmed whether or not the remaining battery level of the battery 530 is above the threshold value set in the first threshold value setting section 523 (ACT S5). If the remaining battery level of the battery 530 is not above the threshold value set in the first threshold value setting section 523 (NO in ACT S5), the charging circuit 510 carries out a mere general charging operation for the battery 530 without using the additional charging method set in the charging condition setting section 526 of the battery control section 520 (ACT S10).

Then after a given time elapses (ACT S11), the remaining battery level is checked again (ACT S1). As to the given time elapse mentioned herein, it is predetermined to reconfirm the remaining battery level of the information processing apparatus 10 at given time intervals, and the given time elapse refers to that the time elapses.

A graph of the remaining battery level and time elapse in the present embodiment is shown in FIG. 4. Herein, a point P and a point R indicate a state where the remaining battery level is the second threshold value, and a point Q and a point S indicate a state where the remaining battery level is first threshold value.

Figure 6:
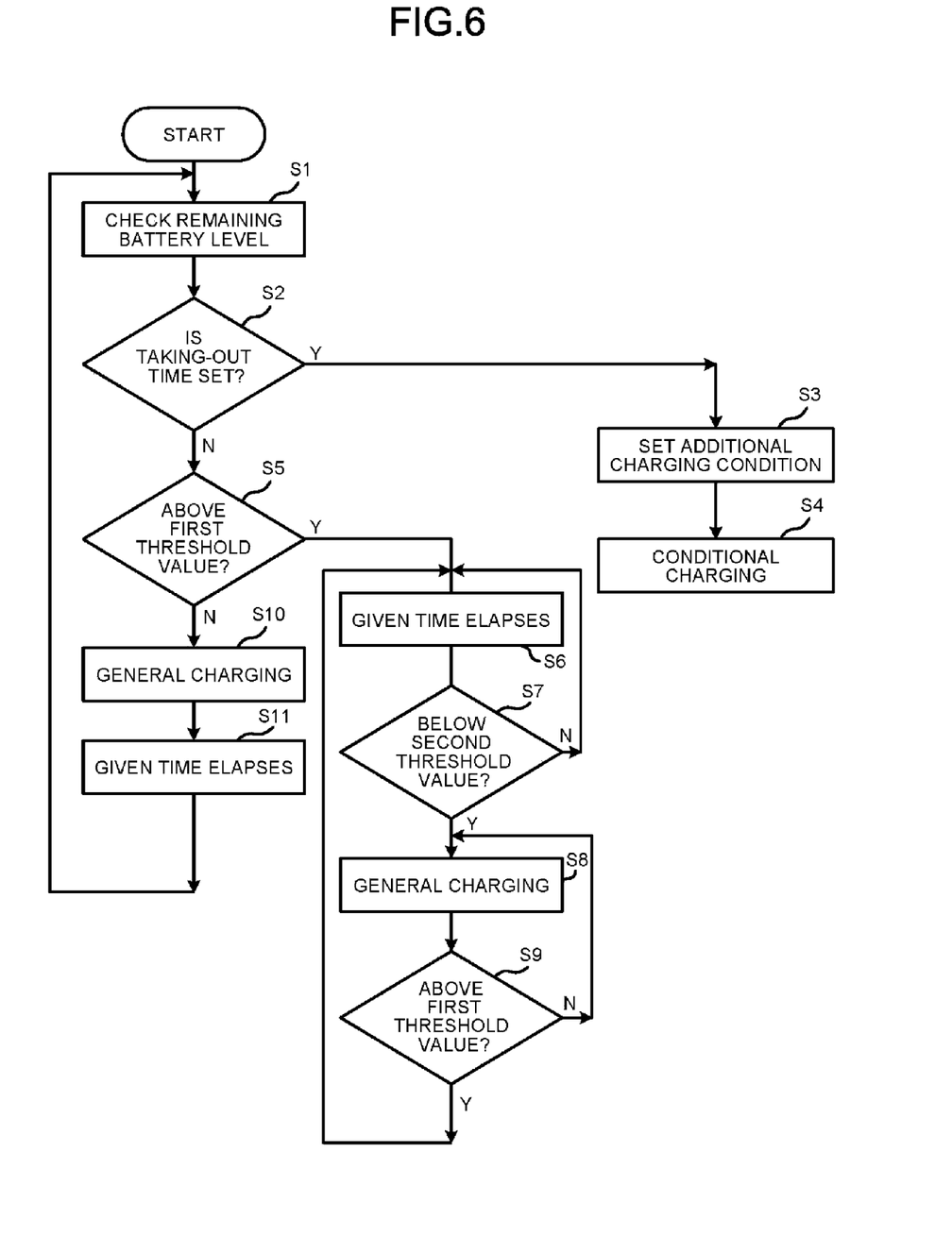
FIG. 6 is a flowchart illustrating a battery charging method according to the first embodiment.

If the 'NO' in the determination on whether or not the remaining battery level is above the first threshold value (NO in ACT S5) and the general charging operation (ACT S10) shown in FIG. 6 are repeated, the remaining battery level increases from the point P towards the point Q in FIG. 4.

It is confirmed whether or not the remaining battery level of the battery 530 is above the threshold value set in the first threshold value setting section 523 (ACT S5), and if the remaining battery level of the battery 530 is above the threshold value set in the first threshold value setting section 523 (YES in ACT S5), the charging circuit 510 does not carry out the charging for the battery 530, and waits until the given time the same as that mentioned above elapses (ACT S6), then it is confirmed whether or not the remaining battery level of the battery 530 is below the threshold value set in the second threshold value setting section 524 (ACT S7). Herein, if it is determined that the remaining battery level is not below the second threshold value (NO in ACT S7), the flow returns to ACT S6.

If the given time elapse (ACT S6) and the 'NO' in the determination on whether or not the remaining battery level is below the second threshold value (NO in ACT S7) shown in FIG. 6 are repeated, the remaining battery level decreases from the point Q towards the point R in FIG. 4.

If it is determined that the remaining battery level of the battery 530 is below the second threshold value (YES in ACT S7), the same as stated above, the charging circuit 510 carries out a mere general charging operation for the battery 530 without using the additional charging method set in the charging condition setting section 526 of the battery control section 520 (ACT S8). Then it is determined whether or not the remaining battery level of the battery 530 is above the first threshold value (ACT S9), if it is determined that the remaining battery level is not above the first threshold value (NO in ACT S9), the flow returns to ACT S8 again to carry out the general charging operation.

If the general charging operation (ACT S8) and the 'NO' in the determination on whether or not the remaining battery level is above the first threshold value (NO in ACT S9) are repeated, in FIG. 4, the remaining battery level decreasing from the point Q to the point R increases towards the point S serving as the first threshold value again.

It is confirmed whether or not the remaining battery level of the battery 530 is above the threshold value set in the first threshold value setting section 523 (ACT S9). If the remaining battery level of the battery 530 is above the threshold value set in the first threshold value setting section 523 (YES in ACT S9), the flow returns to ACT S6 to wait until the given time elapses again (ACT S6). In this way, the remaining battery level decreases in a way like the decreasing of the remaining battery level of the battery 530 from the point Q to the point R in FIG. 4.

As stated above, in a state where the taking-out time is not set (NO in ACT S2), the remaining battery level of the battery 530 changes back and forth between the first threshold value and the second threshold value as shown in FIG. 4.

Next, the charging method in a case where the taking-out time to outdoors is predetermined is described. As stated above, the remaining battery level of the battery 530 changes back and forth between the first threshold value and the second threshold value as shown in FIG. 4. The remaining battery level is controlled to change back and forth between the first threshold value and the second threshold value so as to prevent the deterioration of battery.

In order to operate the information processing apparatus 10 as long as possible in a condition where the apparatus cannot be connected with the AC power supply device, it is preferred that the battery has higher remaining battery level. However, according to the charging method described above, the remaining battery level cannot exceed the first threshold value. In the present embodiment, if the taking-out time is determined, it is set that the remaining battery level of the battery 530 can exceed the first threshold value and reach the full charge (100%) according to the taking-out time.

As stated above, the operator sets the full charge time serving as the taking-out time in advance. The information processing apparatus 10 confirms whether or not the taking-out time is set (ACT S2), and if the taking-out time is set in the full charge time setting section 525 (YES in ACT S2), the information processing apparatus 10 creates, in the charging condition setting section 526, a charging condition where an additional condition is set in addition to the charging condition in a case where the taking-out time is not set (ACT S3).

Figure 5:
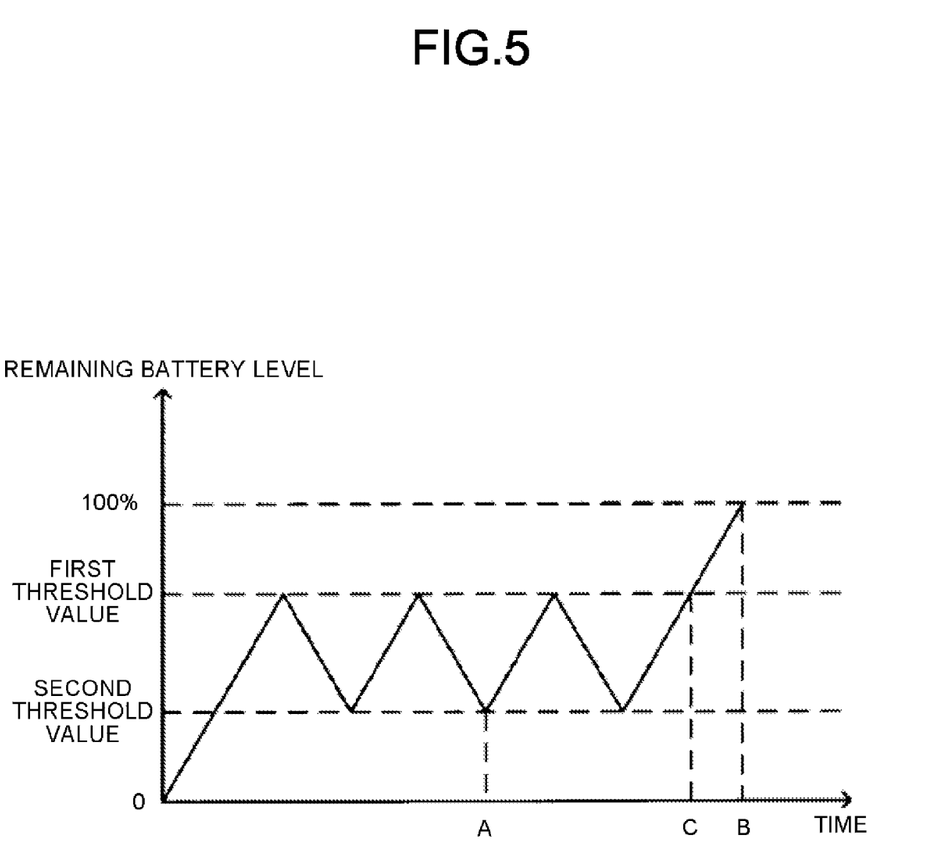
FIG. 5 is an illustration diagram illustrating a relation between the remaining battery level and time in a case where a taking-out time is set according to the first embodiment.

A taking-out time understanding point, the taking-out time and the start time of the condition charging are shown in FIG. 5. A point A indicates the point when that the taking-out time is set is understood, and a point B indicates the taking-out time of the information processing apparatus 10. In addition, the remaining battery level at the point A when that the taking-out time is set is understood is the second threshold value, however, it is not limited to this, the remaining battery level at the point A may also be any value from 0% to 100%.

The charging condition setting section 526 calculates how long it is from the current time stored in the clocking section of the main control section 300 to the taking-out time set in the full charge time setting section 525. Further, a charging condition calculation expression (not shown) is stored in the ROM of the main control section 300, the charging condition setting section 526 calculates the time of a point C shown in FIG. 5 according to the calculation expression. As the point C is in the state of the first threshold value, therefore the point C is the point when the charging stop is started in a case where the taking-out time is not set. However, in the present embodiment, in a case where the remaining battery level reaches the point C, the battery 530 will reach, if continued to be charged, a full charge at the point of the taking-out time B. At the point C, the charging condition setting section 526 outputs an instruction indicating continuing the charging to the charging circuit 510 to charge the battery 530. In this way, as shown in FIG. 5, the remaining battery level of the battery 530 reaches a full charge (100%) at the point B serving as the taking-out time.

As stated above, as the remaining battery level of the battery 530 is controlled between the first threshold value and the second threshold value which are set in advance, it is possible to prevent the deterioration of the battery. Further, in a case where the time of starting using the apparatus powered by the battery is made clear, it is possible to charge the battery 530 in such a manner that the remaining battery level of the battery 530 reaches the full charge at the point of reaching the time.

A Second Embodiment

Figure 7:
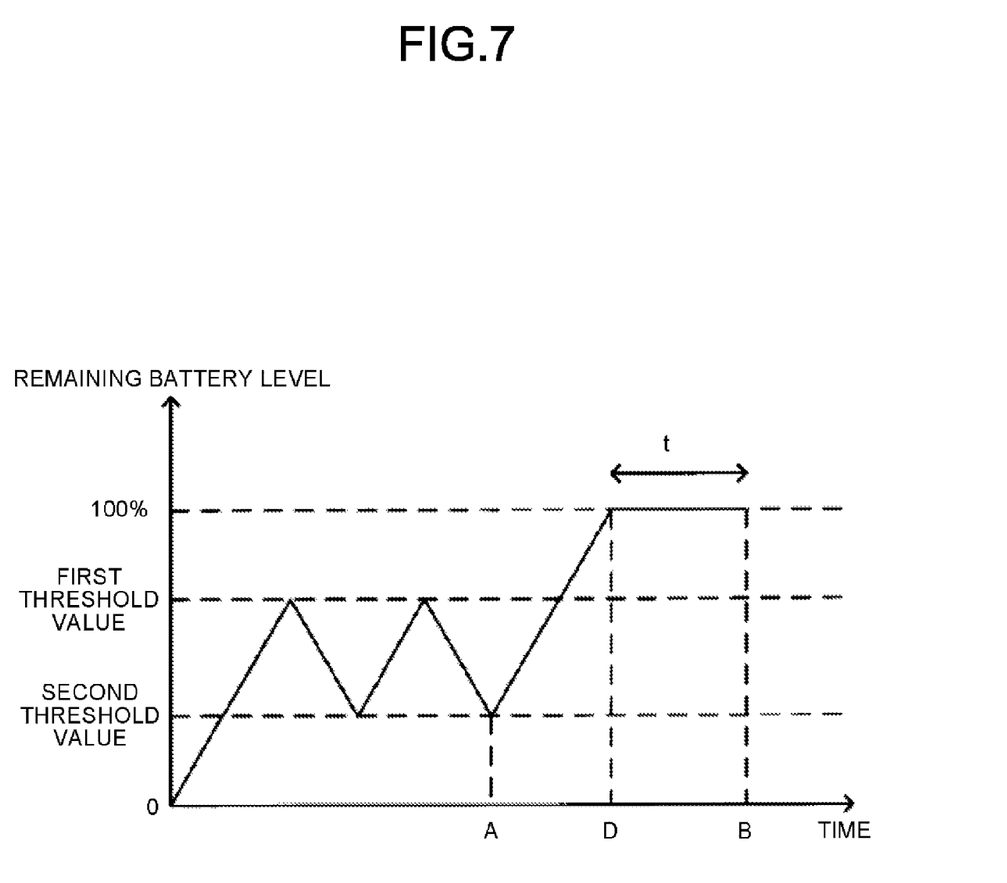
FIG. 7 is an illustration diagram illustrating a relation between the remaining battery level and time in a case where the taking-out time is set according to a second embodiment.

The second embodiment is shown in FIG. 7. The taking-out time understanding point, the taking-out time and a full charge reaching point are shown in FIG. 7. As stated in the first embodiment, the point A indicates the point when that the taking-out time is set is understood, and the point B indicates the taking-out time of the information processing apparatus 10. In addition, the remaining battery level at the point A when that the taking-out time is set is understood is the second threshold value, however, it is not limited to this, the remaining battery level at the point A may also be any value from 0% to 100%.

In the second embodiment, it is switched to the general charging operation from the point when that the taking-out time is set is understood, and an instruction indicating continuing the general charging operation without stopping the charging is output from the charging condition setting section 526 even at the point when the remaining battery level reached the first threshold value If it is switched to the general charging operation from the point when that the taking-out time is set is understood, as shown in FIG. 7, the remaining battery level reached the full charge at a point D which is t earlier than the point B serving as the taking-out time. By charging the battery using such a charging method, even if the information processing apparatus 10 needs to be taken out in a hurry at a point earlier than the point B serving as the originally scheduled taking-out time, it is possible to take out the information processing apparatus 10 at the full charge as long as the point is in the range of the time t. Further, before the point A, it is possible to carry out a battery charging control in such a manner that the remaining battery level changes back and forth between the first threshold value and the second threshold value so as to prevent the deterioration of the battery.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus, comprising:
a power supply section configured to be connectable to an AC power supply;
a battery;
a remaining battery level detection section configured to detect the remaining battery level;
a first threshold value setting section configured to set a charge level lower than a full charge of the battery;
a second threshold value setting section configured to set a charge level lower than the first threshold value;
a charging condition setting section configured to output an instruction on charging of the battery; and
a full charge reaching time setting section configured to set a full charge reaching time of the battery, if setting of the use start time is not detected the charging condition setting section outputs a charging condition for charging the battery to make the remaining battery level such that the remaining battery level changes back and forth between the first threshold value and the second threshold value, after the full charge reaching time is detected the charging condition setting section outputs a charging condition for charging the battery to make the remaining battery level exceed the first threshold value such that the battery reaches a full charge at the full charge reaching time, instead of making the remaining battery level change between the first threshold value and the second threshold value.

2. An information processing apparatus, comprising:
a power supply section configured to be connectable to an AC power supply;
a battery;
a remaining battery level detection section configured to detect the remaining battery level;
a first threshold value setting section configured to set a charge level lower than a full charge of the battery;
a second threshold value setting section configured to set a charge level lower than the first threshold value;
a charging condition setting section configured to output an instruction on charging of the battery such that the remaining battery level changes back and forth between the first threshold value and the second threshold value; and
the charging condition setting section outputs, after the full charge reaching time of the battery is set, a charging condition for charging the battery to make the remaining battery level exceed the first threshold value and reach a full charge at the full charge reaching time, instead of making the remaining battery level change between the first threshold value and the second threshold value.

3. A battery charging method of an information processing apparatus, including:
setting a first threshold value serving as a charge level lower than a full charge of a battery carried in the information processing apparatus and a second threshold value serving as a charge level lower than the first threshold value;
detecting the remaining battery level;
detecting setting a use stat time of the information processing apparatus;
charging the battery in such a manner that the remaining battery level changes back and forth between the first threshold value and the second threshold value if setting of the use start time is not detected; and
charging the battering in such a manner that the remaining battery level exceeds the first threshold value and reaches a full charge at the use start time of the information processing apparatus powered by the battery if setting of the use start time is detected after that time, instead of making the remaining battery level change between the first threshold value and the second threshold value.

4. A battery charging method of an information processing apparatus, including:
setting a first threshold value serving as a charge level lower than a full charge of a battery carried in the information processing apparatus, a second threshold value serving as a charge level lower than the first threshold value, and a necessity of a use start time setting of the information processing apparatus powered by the battery;
detecting the remaining battery level;
charging, in a case where the use start time of the information processing apparatus powered by the battery is not set, the battery in such a manner that the remaining battery level changes back and forth between the first threshold value and the second threshold value;
charging, in a case where the use start time of the information processing apparatus powered by the battery is set after that time, the battery to make the remaining battery level exceed the first threshold value and reach a full charge at the use start time of the information processing apparatus powered by the battery, instead of making the remaining battery level change between the first threshold value and the second threshold value.

* * * * *